No. 741,209. PATENTED OCT. 13, 1903.
J. WRIGHT.
LATHE ACCESSORY.
APPLICATION FILED JAN. 3, 1903.
NO MODEL.

Witnesses.
Inventor
John Wright

No. 741,209. Patented October 13, 1903.

UNITED STATES PATENT OFFICE.

JOHN WRIGHT, OF LONDON, ENGLAND.

LATHE ACCESSORY.

SPECIFICATION forming part of Letters Patent No. 741,209, dated October 13, 1903.

Application filed January 3, 1903. Serial No. 137,705. (No model.)

*To all whom it may concern:*

Be it known that I, JOHN WRIGHT, a subject of the King of Great Britain, residing at 1 Newark street, Stepney, London, England, have invented new and useful Improvements in Lathe Accessories, of which the following is a specification.

My invention has for its object to provide means whereby a lathe may be readily adapted for performing a number of operations which heretofore have usually been performed on a milling-machine—such, for instance, as cutting the teeth of gear-wheels and fluting reamers, taps, twist-drills, and the like—and also to provide means whereby articles to be bored or drilled can be more readily adjusted and manipulated.

According to my invention I provide for attaching to the saddle of the lathe or to the bed a frame capable of adjustment in various directions and in or upon which the work to be operated upon can be held transversely between the ordinary lathe-centers, the cutting or boring or drilling tool being mounted on a mandrel between the usual lathe-centers or carried in the spindle of the head of the lathe. In practice the frame hereinbefore referred to is carried upon the saddle of a lathe, the ordinary slide-rest having been removed therefrom.

Figure 1:
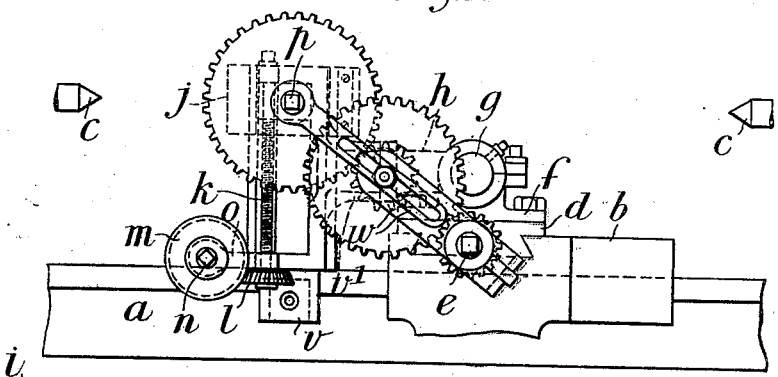
Figures 2, 3, 4:
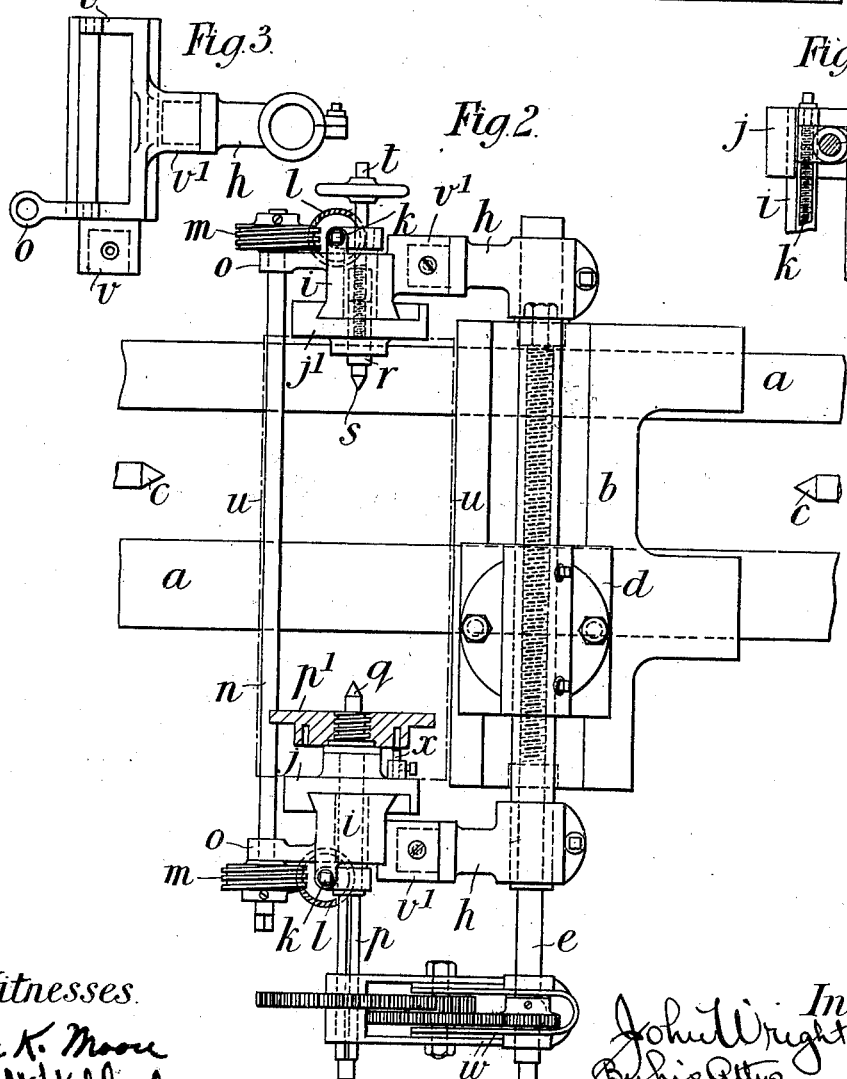

In the accompanying drawings, Figure 1 is an elevation of apparatus constructed according to my invention as applied to the saddle of an ordinary lathe, and Fig. 2 is a plan of the same. Figs. 3 and 4 are elevations of details.

$a$ indicates the bed of a lathe, $b$ the saddle adapted to be traversed upon the said bed, and $c\,c$ the centers of ordinary construction.

Upon the usual slide $d$, which is designed to be traversed across the saddle in the usual manner by a screw $e$, I mount a bracket or block $f$, in which I firmly fix a spindle $g$—for example, by means of set-screws $g'$, as shown—and to the extremities of this spindle I firmly attach two arms $h\,h$, each of which at its outer end carries a block or pillar $i$, having a face with V-shaped guides upon which slides $j\,j'$ work. The slides $j\,j'$ are designed to be moved by means of screws $k\,k$, the said screws being provided with worm-wheels $l\,l$, with which worms $m\,m$, carried by a shaft $n$, supported in arms $o\,o$, projecting from the pillars $i\,i$, engage in such a manner that the rotation of the shaft $n$ will cause the simultaneous movement of the screws $k\,k$, and consequently the simultaneous traversing of the slides $j\,j'$ upon their respective pillars $i\,i$. The slide $j$ carries a spindle $p$, the inner end of which is adapted to receive a center $q$ and is also screw-threaded for carrying a face-plate or driving-carrier, while the other end of the said spindle is adapted for the application of one of a series of change-wheels through the medium of which rotary motion may be transmitted from the screw $e$ to the said spindle $p$. The other slide $j'$ carries a puppet $r$, adapted to receive a center $s$ and to be traversed toward and away from the center $q$ by means of a screw-spindle $t$.

In using the apparatus hereinbefore described the milling-cutter or other tool is mounted upon a mandrel carried between the usual lathe-centers $c\,c$ and adapted to be rotated by the ordinary driving-head of the lathe. The article to be operated upon is carried between the centers $q\,s$ in such a position relatively with the milling tool or cutter that the latter will properly operate upon it and then by means of the screw $e$, the slide $d$, and mechanism which it carries, is traversed across the saddle $b$ to the required extent. If plain surfaces or straight grooves are to be formed, it will be obvious that the article must be held stationary as regards the centers $q\,s$. If, however, a spiral or other formation is to be given to the cut, then the spindle $p$ must be geared with the screw $e$ by suitable change-wheels, so that as the screw $e$ is rotated to traverse the work relatively with the cutter the work itself will also be rotated the required distance, which will be determined by the particular change-wheels employed.

In order to provide for working an article which cannot be conveniently held between the centers $q\,s$, I advantageously arrange between the slides $j\,j'$ a bed or a table $u$, as indicated by dot-and-dash lines in Fig. 2, upon which table the articles may be fixed in any usual manner and which can be raised and lowered by the rotation of the shaft $n$, as hereinbefore described.

In some cases it is necessary to support the work above the lathe-centers $c$ $c$, and for this purpose I form the pillars $i$ $i$ with sockets $v$ at their lower ends, which sockets are similar to the sockets $v'$, which normally support the pillars upon the arms $h$ $h$. It will be obvious that by removing the sockets $v'$ $v'$ from the arms $h$ and applying the sockets $v$ $v$ to the said arms and by unclamping the spindle $g$ in the block $f$ and rotating it until the arms $h$ $h$ are perpendicular and again clamping it the desired result will be obtained.

The frame $w$ between the screw $e$ and spindle $p$ and which carries the change-wheels is made in two parts which are slotted and connected by a bolt, as clearly shown, for the purpose of allowing of the necessary elongation.

In order to provide for cutting the teeth of wheels, a dividing-plate $p'$ can be arranged in connection with the spindle $p$, a pin or pointer, such as $x$, being arranged adjacent to the dividing-plate.

Having now particularly described and ascertained the nature of my said invention and in what manner the same is to be performed, I declare that what I claim is—

1. A lathe accessory comprising among its members, a block adapted to be detachably secured to the tool-carrying slide, a bar secured to said block, arms detachably connected to said bar, a pillar detachably connected to each of said arms, and provided with a vertical guide, a slide mounted in each of said guides, a vertical adjusting-screw operatively connected with each slide, a shaft extending from one of said pillars to the other and gearing connecting said shaft with each of said screws, substantially as described.

2. A lathe accessory, comprising among its members, a block adapted to be detachably secured to the tool-carrying slide, a bar mounted in said block, two arms secured to said bar adjacent to its ends, a vertically-movable slide carried by each arm, mechanism for adjusting said slides simultaneously, a rotary spindle carried by one of said slides, and a puppet carried by the other slide, substantially as described.

3. The combination with a lathe-bed, the saddle movable longitudinally thereof, the tool-carrying slide and a screw-shaft for traversing said slide transversely of the bed, of a lathe accessory comprising a block adapted to be detachably secured to the tool-carrying slide, a bar secured to said block, two arms secured to said bar, a vertically-movable slide carried by each of said arms, a spindle carried by one of said slides, and a train of gearing for connecting said spindle with said traversing screw-shaft, substantially as described.

4. The combination with a lathe-bed, the saddle movable longitudinally thereof, the tool-carrying slide and a screw-shaft for traversing said slide transversely of the bed, of a lathe accessory comprising a block adapted to be detachably secured to the tool-carrying slide, a bar secured to said block, two arms secured to said bar, a vertically-movable slide carried by each of said arms, a spindle carried by one of said slides, a train of gearing for connecting said spindle with said traversing screw-shaft, and a longitudinally-adjustable frame connecting said spindle and screw-shaft and carrying an intermediate gear of said train, substantially as described.

5. A lathe accessory comprising among its members, a block adapted to be detachably connected to the tool-carrying slide, a bar carried by said block, two arms secured to said bar adjacent to its ends, two pillars provided each with a plurality of arm-engaging parts, an adjustable slide carried by each of said pillars, a rotary spindle carried by one of said slides and a puppet carried by the other slide, said arm-engaging parts of said pillars being located at different distances from the centers of the work-holding devices, whereby by connecting one or another of said arm-engaging devices with said arms the distance between the centers of the work-holding devices and the supporting-bar may be varied, substantially as described.

JOHN WRIGHT.

Witnesses:
JOHN E. BOUSFIELD,
A. ALTUTT.